United States Patent
Kale et al.

(10) Patent No.: US 11,794,711 B2
(45) Date of Patent: Oct. 24, 2023

(54) CONTROLLED AIR DELIVERY FOR TIRE INFLATION AND AIR BRAKE

(71) Applicant: Deere & Company, Moline, IL (US)

(72) Inventors: Anuja Kale, Ghodegaon (IN); Dilip M. Jayavant, Pune (IN); Benjamin L. Borgmann, Waterloo, IA (US); Patrick A. Schweigel, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 235 days.

(21) Appl. No.: 17/197,421

(22) Filed: Mar. 10, 2021

(65) Prior Publication Data
US 2022/0289163 A1   Sep. 15, 2022

(51) Int. Cl.
*B60T 17/02*   (2006.01)
*B60C 23/00*   (2006.01)
*B60T 13/26*   (2006.01)

(52) U.S. Cl.
CPC ............ *B60T 17/02* (2013.01); *B60C 23/002* (2013.01); *B60T 13/268* (2013.01); *B60T 2260/08* (2013.01)

(58) Field of Classification Search
CPC ...... B60T 17/02; B60T 17/002; B60T 17/004; B60T 7/20; B60T 13/268; B60T 2260/08; B60W 30/00; B60C 23/00; B60C 23/002; B60C 23/001; B60C 23/0035; B60C 23/00372; B60C 23/16; B60K 6/20;
(Continued)

(56) References Cited

U.S. PATENT DOCUMENTS

| 4,344,656 A | * | 8/1982 | Masterson, Jr. ........ B60T 17/18 303/2 |
| 4,431,043 A | | 2/1984 | Goodell et al. |
| 4,744,399 A | | 5/1988 | Magnuson et al. |

(Continued)

FOREIGN PATENT DOCUMENTS

| CA | 1337080 C | 9/1995 |
| DE | 112017006288 T5 | 8/2019 |

(Continued)

OTHER PUBLICATIONS

Kaczmarek, Robert W., "Central Tire Inflation System (CTIS)—A Means to Enhance Vehicle Mobility . . . ," US Army Tank-Automotive Command, pp. 1255-1271, AD-P004 399, Warren, Michigan.

(Continued)

*Primary Examiner* — Robert A. Siconolfi
*Assistant Examiner* — San M Aung
(74) *Attorney, Agent, or Firm* — TUCKER ELLIS LLP; Michael G. Craig; Heather M. Barnes (57) ABSTRACT

One or more techniques and systems are described herein for synchronized air delivery method between a vehicle's central tire inflation system (CTIS) and an air trailer brake (ATB) system. A synchronized air delivery system can utilize a shared air source as a common shared input to drive two different systems, including the ATB system and CTIS. Based on ATB and CTIS air need feedback, an air compressor clutch can automatically control ON and OFF modes for air inputs using a control algorithm. Air can be provided to the ATB system, to provide air to brakes on a coupled trailer, over the tire inflation operation, such as during a braking event.

20 Claims, 4 Drawing Sheets

(58) Field of Classification Search
CPC ... B60K 6/22; B60K 6/26; B60K 6/48; B60K 6/485; B60R 16/08
USPC .......................................................... 303/2
See application file for complete search history.

(56) References Cited

U.S. PATENT DOCUMENTS

| | | | |
|---|---|---|---|
| 4,782,878 A | | 11/1988 | Mittal |
| 6,116,105 A | * | 9/2000 | Genise .................... F16H 61/16 74/335 |
| 9,045,014 B1 | * | 6/2015 | Verhoff .................... F41H 5/16 |
| 2006/0018766 A1 | * | 1/2006 | Stanczak ................. F04B 49/22 417/440 |
| 2008/0173033 A1 | * | 7/2008 | Colavincenzo ....... F04B 49/065 62/133 |
| 2009/0133395 A1 | * | 5/2009 | Hilberer .................. B60T 17/02 60/329 |
| 2017/0080761 A1 | | 3/2017 | King et al. |
| 2017/0087944 A1 | | 3/2017 | King et al. |
| 2017/0113498 A1 | | 4/2017 | King et al. |
| 2017/0120695 A1 | * | 5/2017 | Staedele ............. B60C 23/0484 |
| 2018/0126967 A1 | * | 5/2018 | Sanders .................. B60T 8/323 |
| 2018/0162181 A1 | | 6/2018 | King |
| 2018/0162374 A1 | * | 6/2018 | Colavincenzo ........ B60K 6/448 |
| 2018/0170125 A1 | | 6/2018 | Woodley |
| 2018/0178598 A1 | | 6/2018 | Woodley |
| 2018/0207575 A1 | | 7/2018 | Dunning et al. |
| 2018/0207999 A1 | | 7/2018 | Dunning et al. |
| 2018/0297422 A1 | | 10/2018 | Ciovnicu et al. |
| 2018/0304697 A1 | | 10/2018 | Woodley et al. |
| 2018/0312017 A1 | | 11/2018 | Woodley et al. |
| 2018/0356798 A1 | * | 12/2018 | Ciovnicu .......... B60C 23/00372 |
| 2021/0016611 A1 | * | 1/2021 | Bechthold ......... B60C 23/00372 |

FOREIGN PATENT DOCUMENTS

| DE | 102022200172 A1 | 8/2022 |
|---|---|---|
| EP | 0164917 A2 | 12/1985 |

OTHER PUBLICATIONS

German Search Report issued in application No. 102022201078.7, dated Sep. 14, 2022, 08 pages.

* cited by examiner

CONTROLLED AIR DELIVERY FOR TIRE INFLATION AND AIR BRAKE

BACKGROUND

Various agricultural and construction vehicles can utilize a central tire inflation system (CTIS) to control the inflation (and deflation) of tires, for example, to avoid soil compaction, to improve performance, reduce tire wear, and improve fuel efficiency. Further, the same vehicles may utilize compressed air for controlling braking systems in the vehicle, and/or attached trailers. In existing complex tractor and other vehicle architectures air resources and space can be important in the designing of component placement. Further, prioritization of the air resources to various systems can help improve desired performance.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for synchronized air delivery method between a vehicle's central tire inflation system (CTIS) and an air trailer brake (ATB) system. In this implementation, a synchronized air delivery system can utilize a shared air source to be used as a common shared input to drive two different systems, including the ATB system and CTIS. For example, based on ATB and CTIS air need feedback, an air compressor clutch can automatically control ON and OFF modes for air inputs using a control algorithm. Further, for example, based on ATB and CTIS feature availability, air sources for the respective ATB and CTIS can be isolated to avoid unnecessary/additional component placements on the vehicle, thereby providing improved and efficient use of power, space, and component placement, as well as weight reduction on the vehicle, to improve overall engine and pneumatic efficiency.

In one implementation of an air management system for a vehicle, the vehicle can comprise an engine, an air compressor, an air trailer brake (ATB) system receiving air from the air compressor, and a central tire inflation system (CTIS) receiving air from the air compressor. In this implementation the system can comprise a clutch assembly that operably receives power from the engine, and the clutch assembly can operably provide power to the air compressor. Further, the system can comprise a central controller that is communicatively coupled with the ATB system, the CTIS, and the clutch assembly to control operation of the clutch assembly using synch logic. In this implementation, the synch logic can determine when to operate the clutch assembly to provide power to the air compressor; when to provide air to the ATB system from the air compressor; when to provide air to the CTIS from the air compressor; and when to provide air from the air compressor to the ATB system over the CTIS.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A system can be devised that can be used to operate an air system on a vehicle. For example, some agricultural and construction vehicles utilize compressed air to operate their braking systems and/or tire inflation systems. In one aspect, an example system may receive requests to provide air to the braking system, such as for a trailer brake, and may also receive requests to provide air to the tire inflation system, to inflate one or more tires on the vehicle. In this aspect, such a system can determine when to provide air to the braking system and when to provide air to the tire inflation system.

Figure 1:
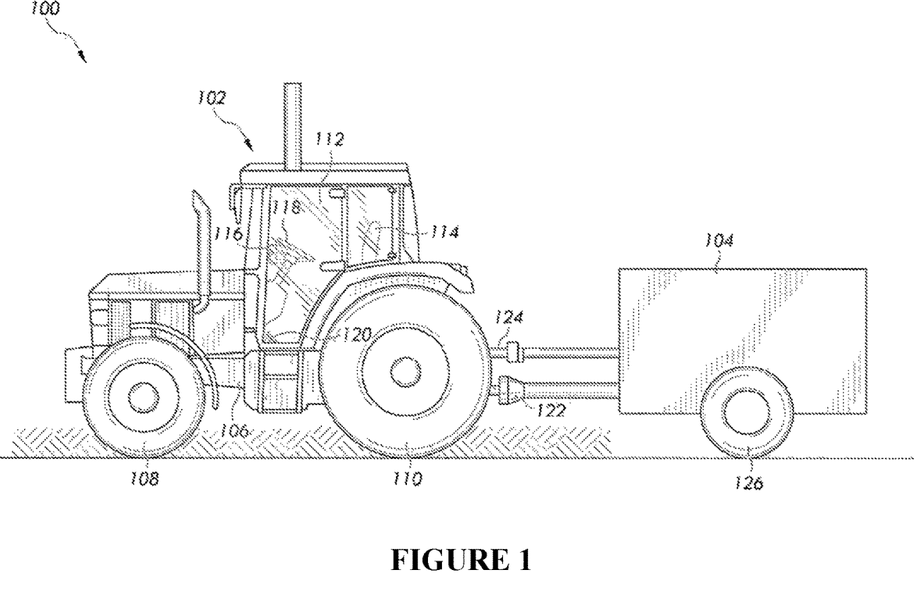
FIG. 1 is a component diagram illustrating an example of an environment where one or more systems described herein may be implemented.

FIG. 1 is a component diagram illustrating an example vehicle combination 100 where a system for controlling air use in the vehicle may be implemented. In this implementation, a tractor 102 is shown coupled to and pulling a trailer 104. The tractor 102 may have a chassis 106 that spans between front wheels 108 with tires and rear wheels 110 with tires. In this implementation, each set of wheels is defined along a respective axle, i.e., a front axle and a rear axle. In other implementations, however, the ground-engaging mechanism may be a track that propels the tractor 102 along a ground surface. Likewise, the trailer 104 may also include at least one wheels 126 with tires.

Further, a cab or operator position 112 may be coupled to the chassis 106 and define a location for an operator to be positioned in an operator's seat 114. From the cab, the operator may control the tractor 102 and trailer 104 via a plurality of controls. As shown, the cab 112 may include a display 116 or dashboard that visually shows control characteristics of the tractor 102 or trailer 104 such as speed, power, temperature, pressure, direction, and any other type of control characteristic, feedback, sensor data, and other operational information and controls. The display 116 may be a touchscreen display that includes one or more operator controls for selectively controlling the operation of the tractor 102 or trailer 104. Other controls may include a steering wheel or yoke 118, pedals 120 (e.g., a brake pedal, clutch pedal, or throttle pedal), any other type of control such as a joystick, switch, lever, knob, etc. for controlling the tractor trailer system 100.

While a tractor 102 is shown and described herein, any type of work machine may utilize the teachings of this disclosure and therefore it is not intended to be limited to applying to only tractors. In other embodiments, a truck configured to tow a trailer may utilize the teachings of this disclosure. Accordingly, the tractor 102 can be any type of applicable work machine used to pull a trailer. Additionally, the tractor 102 may be coupled to the trailer 104 through a hitch member or drawbar 122. The hitch member or drawbar 122 may be sufficiently strong to transfer motion of the tractor 102 to the trailer 104. In one embodiment, when the tractor 102 travels in a forward direction, the hitch member 122 pulls the trailer 104 along therewith in approximately the same direction.

One or more fluid lines may also be provided. For purposes of this disclosure, a fluid may include a gas or liquid. Thus, any pneumatic or hydraulic line may be referred to as a fluid line herein. The one or more fluid lines may selectively fluidly couple a tractor brake system to a trailer brake system. More specifically, the tractor 102 may provide a trailer brake output that is coupled to the trailer brake system. In this configuration, when the user initiates a brake command, both the tractor brake system and the trailer brake system may simultaneously engage to slow the tractor 102 and trailer 104. Further, one or more control links 124 may be coupled between the tractor 102 and trailer 104, such as communication cables, power cables, pneumatic hoses, and other appropriate links that can communicate data, power, or other control components.

Figure 2:
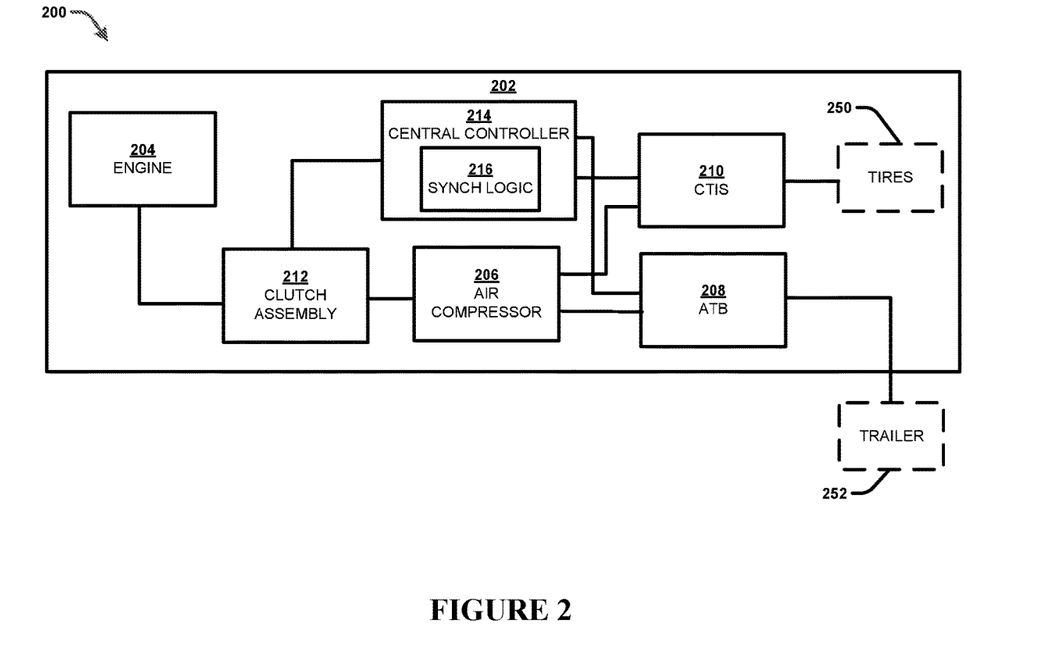
FIG. 2 is a schematic diagrams illustrating one implementation of one or more portion of one or more systems described herein.

FIG. 2 is a schematic diagram illustrating one example implementation of a system 200 for air management in a vehicle, such as a work vehicle that is coupled with a trailer (e.g., as illustrated in FIG. 1). In this example, an example vehicle 202 comprises an engine 204, and an air compressor 206. The engine 204 provides power to the system 200, and the air compressor 206 provides compressed air to the system 200. Further, the example vehicle 200 comprises an air trailer brake (ATB) system 208 that receives air from the air compressor 206. As an example, the ATB system 208 is configured to operate brakes on a trailer coupled with the vehicle 202. Additionally, the example vehicle 200 comprises a central tire inflation system 210 (CTIS) that receives air from the air compressor 206. As an example, the CTIS 210 is configured to control an amount of air (e.g., air pressure) in the tires of the vehicle 202 (e.g., inflate and/or deflate).

In this implementation, the system 200 comprises a clutch assembly 212 that is operably receiving power from the engine 204. The clutch assembly 212 can operably provide power to the air compressor 206 when selectably activated. That is, for example, the clutch assembly 212 can be configured to selectably transfer power from the engine 204 to the air compressor 206. In this example, the clutch assembly 212 can be coupled with the engine 204 to receive power from the engine 204. Further, in a first position, the clutch assembly 212 may be decoupled from the air compressor 206, such that the air compressor 206 does not received the power from the clutch assembly 212. In a second position (e.g., when activated), the clutch assembly 212 can be coupled with the air compressor 206 such that the power is transferred from the engine 204 to the air compressor 206, through the clutch assembly 212. In this way, for example, the air compressor 206 can be selectably activated (e.g., in second position) to produce and provide compressed air, and deactivated (e.g., in first position) to remove the power needed to operate the air compressor 206. In some implementations, the clutch assembly 212 can comprise an electrically activated, electromagnetic clutch, which operably receives an activation signal from a central controller 214. In this way, upon activation, the electromagnetic clutch can be activated electronically by a signal from the central controller 214 to provide power from the engine 204 to the air compressor 206.

In this way, for example, power can selectably be provided to the air compressor 206, merely when it is actually needed. That is, for example, when a request for air is received, the clutch assembly 212 can be activated to provide power to the air compressor 206 to fulfill the request. In this example, when the request is fulfilled, the clutch assembly 212 can be deactivated to remove power from the air compressor 206. Therefore, the air compressor 206 may only be activate, by receiving power from the clutch assembly 212, when needed, for example. In these implementations, this controlled activation of the air compressor 206 using the controlled clutch assembly 212 can provide for improved and efficient use of power from the engine 204, and reduce wear to the air compressor 206 and clutch assembly 212. Prior and existing systems typically utilized air compressor that was always active, and running at least until an air pressure threshold was reached. This type of inefficiency utilizes more power from the engine, which reduces engine efficiency compared to the innovative system described herein.

Further, in this implementation, the system 200 can comprise a central controller 214. The central controller 214 is communicatively coupled with the ATB system 208, with the CTIS 210, and with the clutch assembly 212. The central controller 214 is configured to control operation of the clutch assembly 212 using synch logic 216. In this implementation, the synch logic 216 is configured to determine when to operate the clutch assembly 212 to provide power to the air compressor 206. That is, for example, the synch logic 216 may identify when to activate the clutch assembly 212, and the central controller 214 may transmit a signal (e.g., electrical signal, communication command, radio frequency, some other electro-magnetic signal, etc.) that disposes the clutch assembly 212 in the second position (e.g., activated). In this way, the clutch assembly 212 may couple with the air compressor 206 to provide power from the engine 204 to the air compressor 206, for example, to generate compressed air for the system 200.

In this implementation, the synch logic 216 can also be configured to determine when to provide air to the ATB system 208 from the air compressor 206. That is, for example, one or more conditions detected in the system 200, and/or identified by the central controller 214, may lead the central controller 214 to determine that air is provided to the ATB system 208 from the air compressor 206. As one example, a trailer 252 coupled with the ATB system 208 may have its brakes activated (e.g., by an operator or an automated braking system), where the braking system uses compressed air to apply the trailer brakes. In this example, a request for air may be transmitted by the ATB system 208 and received by the central controller 214. The central controller 214 can transmit a command (e.g., electric signal or other appropriate signal) to the air compressor to provide air to the ATB system 208, for example, which provides the air to the trailer brakes.

In this implementation, the synch logic 216 can also be configured to determine when to provide air to the CTIS 210 from the air compressor 206. That is, for example, one or more conditions detected in the system 200, and/or identified by the central controller 214, may lead the central controller 214 to determine that air is provided to the CTIS 210 from the air compressor 206. As one example, a plurality of tires 250 can be disposed on wheels on the vehicle 202. In this example, a request for air may be transmitted by the CTIS 210 and received by the central controller 214, such as to fill one or more of the tires 250. That is, the vehicle 202 may enter a specific condition in which additional air is requested for the tire 250, such as when a vehicle moves from a field to a road. In this example, after receiving the request, the central controller 214 can transmit a command (e.g., electric signal or other appropriate signal) to the air compressor to provide air to the CTIS 210, for example, which provides the air to one or more of the tires 250.

Additionally, in this implementation, the synch logic 216 can also be configured to determine when to provide air from the air compressor 206 to the ATB system 208 over the CTIS 210. That is, for example, while a CTIS request is being operated on by the central controller 214 (e.g., command sent to air compressor 206 to provide air to tires 250), the central controller 214 may receive a request for air from the ATB system 208. In this example, the request from the ATB system 208 can take precedence over the request from the CTIS 210, because the air supplied to the brake is likely being used for braking of the vehicle rather that tire inflation involved with the CTIS request. Therefore, in this example, the central controller 214, using the synch logic 216, can determine that air should be supplied to the ATB system 208 and not to the CTIS 210 when each system has a request for air, meaning both the CTIS 210 and ATB system 208 are requesting air during a same request time period.

As an example, the vehicle 202 may be underway (e.g., moving) when the CTIS 210 requests air for tire inflation. In these implementations, during the tire inflation operation, an operator may apply the brakes of the vehicle 202, which may result in the ATB system 208 operating the apply air brakes in the trailer 252. In this example, the synch logic 216 can determine that the ATB system 208 request for air take precedence over the CTIS 210 request for air. In this example, the central controller 214 can operably direct the air compressor (e.g., one or more valves therein, or associated with) to switch provision of air from the CTIS 210 to the ATB system 208.

Figure 3:
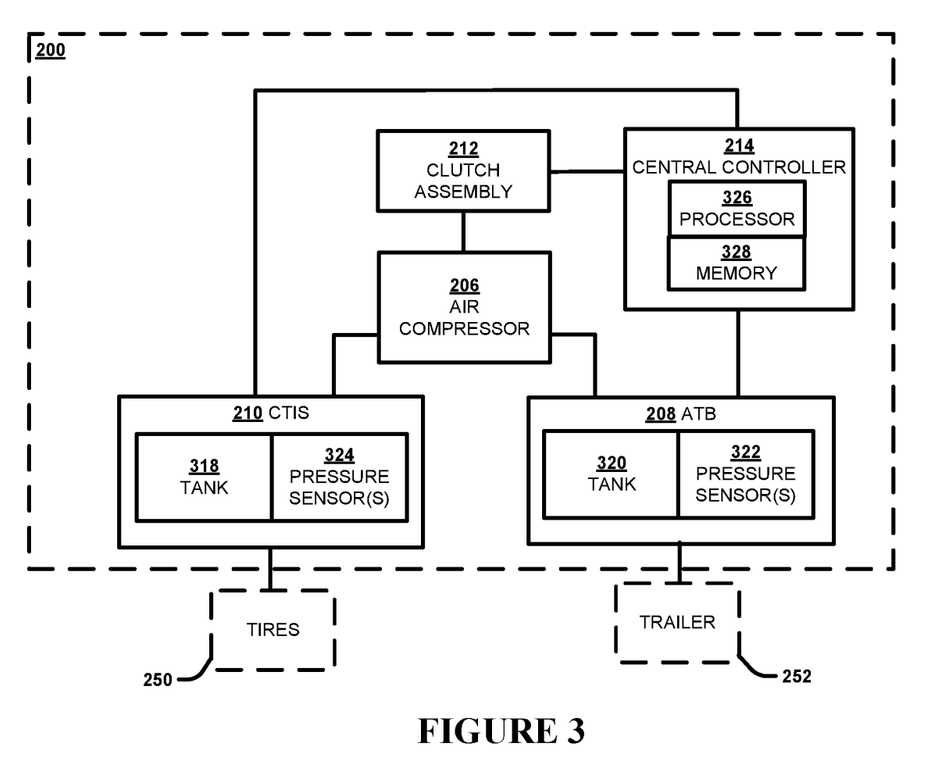
FIG. 3 is a schematic diagram illustrating one implementation of one or more portion of one or more systems described herein.

In some implementations, as illustrated in FIG. 3, the ATB system 208 comprises an ATB air tank 320 that operably provides air to a trailer brake 252. That is, for example, the ATB air tank 320 can be configured to hold pressurized air provided by the air compressor 206. In this way, for example, the air tank 320 can provide compressed air on demand (e.g., substantially instantly) to the air brakes on the trailer 252. In these implementations, the central controller 214 can operably receive ATB pressure data from the ATB system 208 indicative of an ATB air pressure value at the ATB air tank 320. In some implementations, one or more pressure sensors 322 can be coupled with the ATB air tank 320, where the pressure sensor(s) 322 can provide the ATB pressure data for the central controller 214. For example, a pressure sensor can be configured to detect the air pressure inside the air tank 320, and the pressure sensor can be communicatively coupled with the central controller 214 such that the central controller 214 can receive air pressure readings from the tank 320 (e.g., constantly or periodically) in the form of the ATB pressure data.

Further, in this implementation, the central controller 214 can receive ATB request data that is indicative of a request for use of air by the ATB system 208. That is, for example, activation of brakes for the vehicle and/or for the trailer 252 may result in an ATB request being generated by the ATB system. Additionally, an indication that the pressure in the ATB air tank 320 has fallen below a predetermined threshold may also result in the generation of an ATB request by the ATB system 208 and/or the central controller 214. In some implementations, the central controller 214 can operably activate the clutch assembly 212 if the sync logic determines that the ATB pressure data indicates that the ATB air pressure value does not meet a pre-determined first ATB pressure threshold.

As an example, the predetermined first ATB pressure threshold can comprise an amount of air pressure indicated by the pressure sensor(s) 322 that is indicative of an amount of compressed air in the air tank 320 sufficient to perform a desired trailer braking operation. For example, the first threshold indicates enough air to apply the trailer brakes when needed. If the air pressure level of the tank 320 falls below the first threshold level, there may not be enough air in the tank 320 to operably apply the air brakes of the trailer 252. As such, when the central controller 214 can activate the clutch assembly 212 to operate the air compressor 206, to provide compressed air to the ATB air tank 320.

Further, in this implementation, the central controller 214 can deactivate the clutch assembly 212, which is providing power to the air compressor 206, if the sync logic determines that the ATB pressure data indicates that at least the ATB air pressure value meets a pre-determined second ATB pressure threshold. As an example, the second ATB pressure threshold can comprise an air pressure value that is indicative of a desired amount of air in the air tank 320 to perform a braking operation. For example, the second ATB pressure threshold can comprise a level that is greater than or equal to the first ATB pressure threshold. In some implementations, a third ATB pressure threshold may be utilized to indicate when the ATB air tank 320 is substantially full of air (e.g., reached its operable limit). In this example, the second ATB pressure threshold can comprise a value in the range from the first threshold to the third threshold, inclusive.

In some implementations, the central controller 214 can deactivate the clutch assembly 212 from providing power to the air compressor 206 if the sync logic determines that the ATB pressure data indicates at least the ATB air pressure value meets the pre-determined second ATB pressure threshold. In this implementation, the determination can comprise using the sync logic to determine that the ATB air pressure value meets the pre-determined second ATB pressure threshold over a pre-determined first period of time. A first pre-determined period of time can comprise a period of time during which a braking event at the trailer 252 may occur, or a preset value indicative of a desired buffer, such as to ensure sufficient air pressure, and/or to mitigate rapid (e.g., undesired) on-off cycling of the air compressor 206. For example, determining that the ATB air pressure value meets the pre-determined second ATB pressure threshold over a pre-determined first period of time can mitigate the amount of time the engaging and disengaging of the clutch assembly 212 occurs. That is, if the threshold is met and subsequently not met, the clutch assembly 212 may be constantly engaging and disengaging, which could increase wear on the components of the clutch assembly 212 and air compressor 206.

In some implementations, the CTIS 210 can comprise a CTIS air tank 318 that operably provides air to the CTIS 210. That is, for example, the CTIS provides air to the plurality of tires when they are inflated. In this implementation, the CTIS air tank 318 can provide, at least some of, the air used to inflate the tires. In this implementation, the central controller 214 can operably receive CTIS pressure data from the CTIS 210 indicative of a CTIS air pressure value at the CTIS air tank 318. As an example, one or more CTIS pressure sensors 324 may be utilized by the CTIS 210 to detect the air pressure level in the CTIS air tank 318. In this example, the sensor(s) 324 can provide the CTIS pressure data to the central controller 214 (e.g., constantly or periodically). Further, in some implementation, the pressure sensors 324 can comprise pressure sensors that detect the air pressure in each of the plurality of tires 250. That is, the CTIS can comprise pressure sensors 324 that detect the air tank pressure, along with the air pressure in each of the tires 250. In this way, the CTIS and/or the central controller can determine how much air may be needed, and when to apply air to the respective tires 250.

The central controller 214 can receive CTIS request data that is indicative of a request for the use of air by the CTIS 210. That is, for example, the operator or a system in the vehicle may indicate that one or more of the tires 250 shall be inflated. In this example, the central controller 214 may identify how much air is in each of the tires, and how much is in the CTIS tank 318, as described above. Further, based on the information and the request, the synch logic can determine if the air from the air compressor 206 needs to be provided to the CTIS 210 (e.g., either the tank 318 and/or the tires 250). That is, the CTIS air tank 318 can be used merely to overcome the pressure that the respective tires apply to a tire valve, so that additional air can be provided into the tires 250. In this example, the synch logic may identify if the tank 318 has enough air to overcome the tire pressure, and the synch logic can identify if additional air needs to be provided to the target tire to complete the desired tire inflation.

In these implementations, the central controller 214 can activate the clutch assembly 212 to provide power to the air compressor 206, if the sync logic determines that the CTIS pressure data indicates that the CTIS air pressure value does not meet a pre-determined first CTIS pressure threshold. That is, air can be provided to the CTIS air tank 318 if the desired pressure value is not present in the CTIS 210. The first CTIS pressure threshold can comprise a level that indicates enough air to overcome a tire pressure in the tires 250, such that air can be delivered to the tires 250 when requested. Further, the central controller 214 can activate the clutch assembly 212 when the central controller 214 operably receives the CTIS request data. As described above, the CTIS request can comprise a request to add air to one or more of the tires 250.

Additionally, the central controller 214 can provide air to the ATB system 208 over the CTIS 210 when execution of both the ATB request and the CTIS request is received during a same use time interval, at least until operation of the ATB request has ended. As described above, the operator of the vehicle may desire to have air available to the trailer brakes over the tire inflation. In this implementation, the central controller 214 can use the synch logic to determine when air should be provided to the ATB system 208 over the CTIS 210, such as when the CTIS 210 is performing a tire inflation operation; or when the pressure level in the ATB air tank 320 does not meet the ATB system first pressure threshold. For example, the central controller 214 can send air to the ATB air tank 320 instead of the CTIS 210, when a condition is identified, such as an ATB request or an indication that the tank 320 pressure is below the target threshold.

In some implementations, the clutch assembly 212 can be deactivated, deactivating power to the air compressor 206, if the sync logic determines that the CTIS pressure data indicates that at least the CTIS air pressure value meets a pre-determined second CTIS pressure threshold. That is, for example, if the air pressure in the CTIS air tank 318 meets the second CTIS pressure threshold (e.g., a level sufficient to overcome the tire air pressure to fill the tires), and/or the air pressure in a target tire being filled meets the desired inflation pressure, the air compressor 206 can be shut off. In some implementations, the clutch assembly can be deactivated if the sync logic determines that a predetermined portion of a CTIS duty cycle for tire inflation has been met. That is, for example, a CTIS duty cycle for tire inflation can be set up as a predetermined tire inflation cycle, based on a target use (e.g., driving on a road). In this example, the duty cycle may indicate a target tire pressure for the respective tires over a period of time. As such, in this example, the clutch assembly can be deactivated if the synch logic determines that the duty cycle has been met.

In some implementations, the central controller 214, upon receipt of a CTIS request indicative of air needed by the CTIS 210, can identify a target tire pressure value for respective one or more tires 250 from the CTIS request. That is, for example, a duty cycle or predetermined set tire pressure may be indicated by a vehicle system, such as an on-board tire inflation program, which can be used by the CTIS 210. Further, upon receipt of a CTIS request the central controller 214 can receive tire pressure data from the respective one or more tires (e.g., sensors 324) indicative of actual tire pressure value; and may activate the clutch assembly 212 to provide power to the air compressor 206 at least until the target tire pressure value is met at the respective one or more tires. Alternately, the central controller 214 may operate an exhaust valve at the respective one or more tires 250 to release air at least until the target tire pressure value is met. That is, the central controller can use existing tire pressure and target tire pressure, for example, to determine when the air compressor needs to provide air to the tires 250.

In some implementations, the central controller can, upon receipt of a CTIS request, use the synch logic 216 to determine a duty cycle time period for the CTIS to reach the target tire pressure for the respective one or more tires from the CTIS request. That is, for example, the central controller has identified a target tire pressure and the current tire pressure and, based on this information, can determine how long it may take to reach the target tire pressure using the air compressor supplied air. Further, the central controller 214 can activate the clutch assembly 214 to provide power to the air compressor 206 at least until the pre-determined portion of the CTIS duty cycle has been met. The pre-determined portion can comprise a period of time that is sufficient to provide at least enough air to the tires 250 to perform the target operation.

Figure 4:
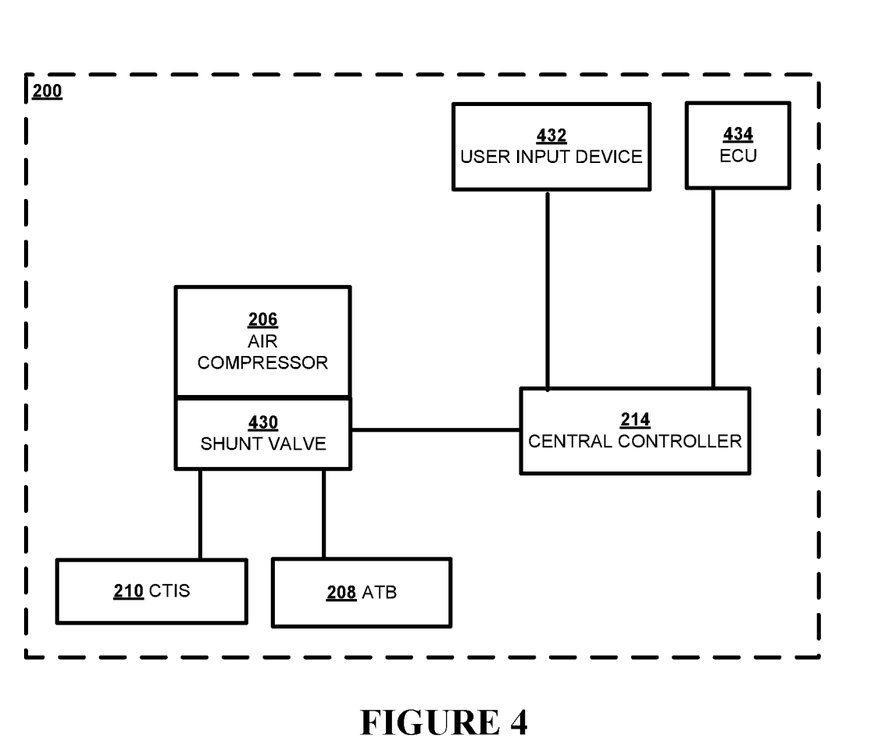
FIG. 4 is a schematic diagram illustrating an alternate implementation of an example system described herein.

In some implementations, as illustrated in FIG. 4, the example system 200 can comprise an electronically activated shunt valve 430 that is disposed downstream from the air compressor 206. That is, for example, the air compressor 206 generates compressed air, the downstream flow of which is controlled by the shunt valve 430. The shunt valve 430 can operate to direct fluid between different downstream flows, such as to the CTIS 210 and the ATB system 208. The shunt valve 430 can be activated by the central controller 214 to operably direct air from the air compressor 206 to the ATB system 208 at least when the central controller 208 receives an ATB request. That is, for example, if the central controller 214 receives an ATB request for air to the ATB system 208, such as when the brakes are applied or when the ATB air tank pressure does not meet the ATB first pressure threshold, the shunt valve 430 can be activated to direct air to the ATB system 208. Further, The shunt valve 430 can be activated by the central controller 214 to operably direct air from the air compressor 430 to the CTIS 210 at least when the central controller 214 receives a CTIS request and the central controller 214 is not performing an ATB request. That is, for example, if the ATB system 208 is not requesting air for the braking system and/or air tank, the shunt valve 430 can be activated to direct air to the CTIS 210.

In some implementations, a clutch cycle timer may be utilized, such as by the central controller 214, to mitigate rapid (e.g., undesired) on-off cycling of the clutch assembly 212. As an example, rapid activation-deactivation of the clutch assembly can increase wear and/or increase fatigue to one or more portions of the clutch assembly 212 (e.g., and other parts of the system, such as the air compressor 206 (e.g., and one or more air tanks). In these implementations, the clutch cycle timer can comprise a second pre-determined period of time that may extend past the time period used by an activated clutch assembly 212 to fulfill an ATB and/or CTIS request. That is, for example, even after an ATB and/or CTIS request is fulfilled, with respect to an amount of air requested for the task, the clutch assembly may be allowed to stay activated (e.g., on) for a period of time that is less than or equal to the second pre-determine period of time. In some implementations, the second pre-determined period of time can comprise a range of five to ten seconds, inclusive. In these implementations, for example, the clutch cycle timer can be activated upon activation of the clutch assembly. In this example, if the time is set to ten seconds, the clutch can remain activated for at least ten seconds, even if the requested operation takes less than ten seconds to perform. In this way, the on-off cycling of the clutch assembly, and therefore the air compressor, can be reduced, which may increase the life of the system.

In some implementations, as illustrated in FIG. 4, with continued reference to FIG. 2, the example system 200 can comprise a user input device 432 that is communicatively coupled with the central controller 214. In this implementation, the user input device 432 can operably receive user input that is indicative of: a CTIS request, a type of trailer coupled with the vehicle; a type of tire installed on the vehicle; a first ATB pressure threshold, a second ATB pressure threshold, a first CTIS pressure threshold, and/or a second CTIS pressure threshold. For example, the user input device 432 is operable to receive data that is indicative of information used by the synch logic 216 to determine when to activated the clutch assembly 212 to provide power to the air compressor 206, when to provide air to the ATB system 208, when to provide air to the CTIS 210, and when to provide air to the ATB system 208 over the CTIS 210. A CTIS request can be input by a user, and/or identified by a program for managing tire pressure. A type of trailer can be input by a user, and/or automatically detected when coupled. The type of tire can be input by a user, and/or detected by the system 200 when coupled to the vehicle 202. The first and second ATB pressure thresholds can be input by the user, and/or automatically identified based on the specifications of the ATB system 208 and the type of trailer coupled. The first and second CTIS pressure thresholds can be input by the user, and/or automatically identified based on the specifications of the CTIS 210 and the type of tires installed, and the type of tire inflation program used.

In some implementations, as illustrated in FIG. 4, with continued reference to FIG. 2, the example system 200 can comprise an electronic control unit (ECU) 434. The ECU 434 can be disposed in the vehicle 202 to manage one or more operations of the vehicle 202. In this implementation, the ECU 434 can provide an ATB request to the central controller 214 based at least upon a detected braking event. For example, the ECU 434 may identify when the vehicle 202 experiences a braking event (e.g., brakes activated by user or automatically). In this example, the detection of the braking event can be provided to the central controller 214 as an ATB request for air to the ATB system 208. Further, the ECU 434 can provide a CTIS request to the central controller based at least upon a detected tire air pressure adjustment event. For example, the ECU 434 may identify when the vehicle 202 is undergoing a tire pressure adjustment (e.g., requested, unplanned, automatic) event. In this example, the detection of the tire pressure adjustment event can be provided to the central controller 214 as a CTIS request for air to the CTIS 210.

In some implementations, the central controller 214 can comprise one or more computer processors 326 that process data and execute programming. Further, the central controller can comprise memory 328 that stores executable programming, such as synch logic 216. In this way, for example, the central controller 214 can receive requests, pressure data, commands, etc. and use the processor(s) 326 to make determinations, generate commands, and perform other appropriate functions using the synch logic stored in memory 328.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An air management system for a vehicle having an engine, an air compressor, an air trailer brake (ATB) system receiving air from the air compressor, and a central tire inflation system (CTIS) receiving air from the air compressor, the system comprising:
    a clutch assembly operably receiving power from the engine, the clutch assembly operably providing power to the air compressor; and
    a central controller communicatively coupled with the ATB system, the CTIS, and the clutch assembly to control operation of the clutch assembly using synch logic, wherein the synch logic determines:
        when to operate the clutch assembly to provide power to the air compressor;
        when to provide air to the ATB system from the air compressor;
        when to provide air to the CTIS from the air compressor; and
        when to provide air from the air compressor to the ATB system over the CTIS;
    wherein the ATB system comprises an ATB air tank that operably provides air to a trailer brake, and wherein the central controller operably receives one or more of:
        ATB pressure data from the ATB system indicative of an ATB air pressure value at the ATB air tank; and
        ATB request data indicative of a request for use of air by the ATB system; and
    wherein the central controller operably performs one or more of:
        activating the clutch assembly if the sync logic determines that the ATB pressure data indicates that the ATB air pressure value does not meet a pre-determined first ATB pressure threshold, and
        deactivating the clutch assembly if the sync logic determines that the ATB pressure data indicates that at least the ATB air pressure value meets a pre-determined second ATB pressure threshold.

2. The system of claim 1, wherein the CTIS comprises a CTIS air tank that operably provides air to the CTIS, and wherein the central controller operably receives one or more of:
    CTIS pressure data from the CTIS indicative of a CTIS air pressure value at the CTIS air tank; and
    CTIS request data indicative of a request for use of air by the CTIS.

3. The system of claim 2, wherein the central controller operably performs one or more of:
    activating the clutch assembly if the sync logic determines that the CTIS pressure data indicates that the CTIS air pressure value does not meet a pre-determined first CTIS pressure threshold;
    activating the clutch assembly when the central controller operably receives the CTIS request data; and
    providing air to the ATB system over the CTIS when execution of both the ATB request and the CTIS request is received during a same use time interval, at least until operation of the ATB request has ended.

4. The system of claim 1, wherein the clutch assembly comprises an electrically activated, electromagnetic clutch, which operably receives an activation signal from the central controller.

5. The system of claim 1, comprising a pressure sensor coupled with the ATB air tank, the pressure sensor providing the ATB pressure data for the central controller.

6. The system of claim 1, deactivating the clutch assembly if the sync logic determines that the ATB pressure data indicates at least the ATB air pressure value meets the pre-determined second ATB pressure threshold comprising determining that the ATB air pressure value meets the pre-determined second ATB pressure threshold over a pre-determined first period of time.

7. The system of claim 2, comprising one or more of:
    deactivating the clutch assembly if the sync logic determines that the CTIS pressure data indicates that at least the CTIS air pressure value meets a pre-determined second CTIS pressure threshold; and
    deactivating the clutch assembly if the sync logic determines that a predetermined portion of a CTIS duty cycle for tire inflation has been met.

8. The system of claim 2, the central controller, upon receipt of a CTIS request, performing one or more of:
    identifying a target tire pressure value for respective one or more tires from the CTIS request;
    receiving tire pressure data from the respective one or more tires indicative of actual tire pressure value;
    operating an exhaust valve at the respective one or more tires to release air at least until the target tire pressure value is met; and
    activating the clutch assembly to provide power to the air compressor at least until the target tire pressure value is met at the respective one or more tires.

9. The system of claim 2, the central controller, upon receipt of a CTIS request, performing one or more of:
    identifying a target tire pressure value for respective one or more tires from the CTIS request;
    receiving tire pressure data from the respective one or more tires indicative of actual tire pressure value;
    using the synch logic to determine a duty cycle time period for the CTIS to reach the target tire pressure for the respective one or more tires from the CTIS request; and
    activating the clutch assembly to provide power to the air compressor at least until the a pre-determined portion of the CTIS duty cycle has been met.

10. The system of claim 1, the central controller comprising:
    one or more computer processors to process data; and
    memory for storing the synch logic.

11. The system of claim 1, comprising an electronically activated shunt valve disposed downstream from the air compressor, the shunt valve activated by the central controller to operably:

direct air from the air compressor to the ATB system at least when the central controller receives an ATB request; and direct air from the air compressor to the CTIS at least when the central controller receives a CTIS request and the central controller is not performing an ATB request.

12. The system of claim 1, comprising one or more of:

a user input device communicatively coupled with the central controller, the user input device operably receiving user input indicative of one or more of: a CTIS request, a type of trailer coupled with the vehicle; a type of tire installed on the vehicle; a first ATB pressure threshold, a second ATB pressure threshold, a first CTIS pressure threshold, a second CTIS pressure threshold; and an electronic control unit (ECU) that provides an ATB request to the central controller based at least upon a detected braking event, and provides a CTIS request to the central controller based at least upon a detected tire air pressure adjustment event.

13. A vehicle air management system, comprising:

an engine that provides power;

an air compressor;

a clutch assembly that receives the power from the engine, and operably provides the power to the air compressor;

an air trailer brake (ATB) system that receives compressed air from the air compressor to operably provide the compressed air to a coupled trailer brake;

a central tire inflation system (CTIS) that receives compressed air from the air compressor to operably provide the compressed air to one or more tires on the vehicle; and a central controller controlling operation of the clutch assembly using synch logic, the synch logic determining one or more of:

to operate the clutch assembly to provide power to the air compressor based at least upon a received ATB request indicative of air needed by the ATB system;

to operate the clutch assembly to provide power to the air compressor based at least upon a received CTIS request indicative of air needed by the CTIS;

to provide air from the air compressor to the ATB system over the CTIS based at least upon the received ATB request;

wherein the central controller, upon receipt of a CTIS request, performs one or more of:

uses the synch logic to determine a duty cycle time period for the CTIS to reach a target tire pressure for respective one or more tires from the CTIS request; and activates the clutch assembly at least until a pre-determined portion of the CTIS duty cycle has been met.

14. The system of claim 13, wherein the clutch assembly comprises an electrically activated, electromagnetic clutch, which operably receives an activation signal from the central controller.

15. The system of claim 13, the ATB system comprising an ATB air tank and coupled ATB pressure sensor, the pressure sensor providing ATB pressure data to the central controller, and wherein the central controller:

activates the clutch assembly if the sync logic determines that the ATB pressure data indicates that an ATB air pressure value does not meet a pre-determined first ATB pressure threshold, and deactivates the clutch assembly if the sync logic determines that the ATB pressure data indicates that at least the ATB air pressure value meets a pre-determined second ATB pressure threshold.

16. The system of claim 13, the central controller operably receiving the CTIS request and:

activating the clutch assembly;

directing the air to the CTIS using an electrically activated valve downstream from the air compressor; and providing air to the ATB system over the CTIS when the central controller receives an ATB request during operation of the CTIS request, at least until operation of the ATB request has ended.

17. A system for controlling air pressure in a vehicle with an air trailer brake (ATB) system for operably towing a trailer, and a central tire inflation system (CTIS) for operably controlling tire inflation of tires installed on the vehicle, comprising:

an engine that provides power;

an air compressor that operably provides compressed air to the ATB system and the CTIS system;

a clutch assembly that receives the power from the engine, and operably provides the power to the air compressor; and a central controller controlling operation of the clutch assembly using synch logic, the synch logic stored on memory, and operated on by one or more computer processors, the sync logic determining one or more of:

to operate the clutch assembly based at least upon:

an ATB request received by the central controller, the ATB request comprising data indicative of a request for provision of compressed air to the ATB system;

receipt of ATB pressure data from a pressure sensor at an ATB air tank, where the ATB pressure data indicates that an ATB pressure value for the ATB air tank does not meet a predetermined ATB threshold; and a CTIS request received by the central controller, the CTIS request comprising data indicative of a request of provision of compressed air to the CTIS system; and to prioritize provision of air from the air compressor to the ATB system over the CTIS when an ATB request is received; and an electronic control unit (ECU) that provides the ATB request to the central controller based at least upon a detected braking event, and provides the CTIS request to the central controller based at least upon a detected tire air pressure adjustment event.

18. An air management system for a vehicle having an engine, an air compressor, an air trailer brake (ATB) system receiving air from the air compressor, and a central tire inflation system (CTIS) receiving air from the air compressor, the system comprising:

a clutch assembly operably receiving power from the engine, the clutch assembly operably providing power to the air compressor;

a central controller communicatively coupled with the ATB system, the CTIS, and the clutch assembly to control operation of the clutch assembly using synch logic, wherein the synch logic determines:

when to operate the clutch assembly to provide power to the air compressor;

when to provide air to the ATB system from the air compressor;

when to provide air to the CTIS from the air compressor; and when to provide air from the air compressor to the ATB system over the CTIS; and an electronically activated shunt valve disposed downstream from the air compressor, the shunt valve activated by the central controller to operably:
  direct air from the air compressor to the ATB system at least when the central controller receives an ATB request; and
  direct air from the air compressor to the CTIS at least when the central controller receives a CTIS request and the central controller is not performing an ATB request.

19. A vehicle air management system, comprising:
an engine that provides power;
an air compressor;
a clutch assembly that receives the power from the engine, and operably provides the power to the air compressor;
an air trailer brake (ATB) system that receives compressed air from the air compressor to operably provide the compressed air to a coupled trailer brake, the ATB system comprising an ATB air tank and coupled ATB pressure sensor, the pressure sensor providing ATB pressure data to the central controller, and wherein the central controller:
  activates the clutch assembly if the sync logic determines that the ATB pressure data indicates that an ATB air pressure value does not meet a pre-determined first ATB pressure threshold, and
  deactivates the clutch assembly if the sync logic determines that the ATB pressure data indicates that at least the ATB air pressure value meets a pre-determined second ATB pressure threshold;
a central tire inflation system (CTIS) that receives compressed air from the air compressor to operably provide the compressed air to one or more tires on the vehicle; and
a central controller controlling operation of the clutch assembly using synch logic, the synch logic determining one or more of:
  to operate the clutch assembly to provide power to the air compressor based at least upon a received ATB request indicative of air needed by the ATB system;
  to operate the clutch assembly to provide power to the air compressor based at least upon a received CTIS request indicative of air needed by the CTIS;
  to provide air from the air compressor to the ATB system over the CTIS based at least upon the received ATB request.

20. A vehicle air management system, comprising:
an engine that provides power;
an air compressor;
a clutch assembly that receives the power from the engine, and operably provides the power to the air compressor;
an air trailer brake (ATB) system that receives compressed air from the air compressor to operably provide the compressed air to a coupled trailer brake;
a central tire inflation system (CTIS) that receives compressed air from the air compressor to operably provide the compressed air to one or more tires on the vehicle; and
a central controller controlling operation of the clutch assembly using synch logic, the synch logic determining one or more of:
  to operate the clutch assembly to provide power to the air compressor based at least upon a received ATB request indicative of air needed by the ATB system;
  to operate the clutch assembly to provide power to the air compressor based at least upon a received CTIS request indicative of air needed by the CTIS;
  to provide air from the air compressor to the ATB system over the CTIS based at least upon the received ATB request;
wherein the central controller operably receives the CTIS request and:
  activates the clutch assembly;
  directs the air to the CTIS using an electrically activated valve downstream from the air compressor; and
  provides air to the ATB system over the CTIS when the central controller receives an ATB request during operation of the CTIS request, at least until operation of the ATB request has ended.

* * * * *